US012265940B2

(12) United States Patent
Kitahama et al.

(10) Patent No.: US 12,265,940 B2
(45) Date of Patent: Apr. 1, 2025

(54) PHYSICAL DISTRIBUTION SYSTEM, PHYSICAL DISTRIBUTION CONTROL METHOD, AND NON-TRANSITORY COMPUTER-READABLE MEDIUM STORING PHYSICAL DISTRIBUTION CONTROL PROGRAM

(71) Applicant: TOYOTA JIDOSHA KABUSHIKI KAISHA, Toyota (JP)

(72) Inventors: Kenichi Kitahama, Toyota (JP); Ryo Murakami, Toyota (JP); Hisashi Iizuka, Susono (JP); Mitsunori Hosokawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 146 days.

(21) Appl. No.: 17/944,627

(22) Filed: Sep. 14, 2022

(65) Prior Publication Data
US 2023/0186227 A1 Jun. 15, 2023

(30) Foreign Application Priority Data
Dec. 13, 2021 (JP) ................ 2021-201559

(51) Int. Cl.
*G06Q 10/083* (2024.01)
(52) U.S. Cl.
CPC ................ *G06Q 10/083* (2013.01)
(58) Field of Classification Search
CPC ................................................ G06Q 10/083
See application file for complete search history.

(56) References Cited

U.S. PATENT DOCUMENTS

| 9,536,216 B1 * | 1/2017 | Lisso ............ B65B 43/00 |
| 2013/0198100 A1 | 8/2013 | Klingenberg et al. |

(Continued)

FOREIGN PATENT DOCUMENTS

| JP | 2002-274646 A | 9/2002 |
| JP | 2003-300624 A | 10/2003 |

(Continued)

OTHER PUBLICATIONS

Jennings, Dylan, and Miguel Figliozzi. "Study of sidewalk autonomous delivery robots and their potential impacts on freight efficiency and travel." Transportation Research Record 2673.6 (2019): 317-326. (Year: 2019).*

*Primary Examiner* — Scott M Tungate
(74) *Attorney, Agent, or Firm* — Dinsmore & Shohl LLP (57) ABSTRACT

In a physical distribution system, a delivery controller is configured to acquire package information; generate a delivery schedule; calculate tentative delivery time of a package estimated based on the delivery schedule; send a delivery confirmation request notification requesting confirmation of the tentative delivery time to a consignee linked to the package; receive a response to the delivery confirmation request notification; control the autonomous mobile robot based on the delivery schedule generated most recently; and when confirmed time confirmed by the consignee in the response to the delivery confirmation request notification is different from the tentative delivery time, update the delivery schedule in such a manner that delivery of the package is completed at the confirmed time.

8 Claims, 9 Drawing Sheets

(56) References Cited

U.S. PATENT DOCUMENTS

| | | | |
|---|---|---|---|
| 2020/0097890 A1* | 3/2020 | Migita | G06Q 10/08 |
| 2020/0122927 A1* | 4/2020 | Bellar | G06Q 10/087 |
| 2020/0288895 A1* | 9/2020 | Bennet | G06Q 10/08 |
| 2020/0393260 A1* | 12/2020 | Falck | G06Q 10/08355 |
| 2021/0158291 A1 | 5/2021 | Kita | |
| 2021/0209712 A1 | 7/2021 | Kitahama | |
| 2021/0256472 A1* | 8/2021 | Javidan | H04W 4/12 |
| 2023/0375349 A1* | 11/2023 | Ahtikari | B60L 58/12 |

FOREIGN PATENT DOCUMENTS

| | | |
|---|---|---|
| JP | 2004-010252 A | 1/2004 |
| JP | 2021-109712 A | 8/2021 |
| WO | 2020/158073 A1 | 8/2020 |

* cited by examiner

EXAMPLE OF EFFICIENCY OPTIMIZATION

| OPTIMIZATION ITEMS | CONTENT OF OPTIMIZATION |
|---|---|
| MINIMIZE TIME REQUIRED FOR PACKAGE DELIVERY | GENERATE DELIVERY SCHEDULE THAT MINIMIZES TIME REQUIRED TO DELIVER ALL PACKAGES BASED ON DESIRED DELIVERY TIMES AND DELIVERY ADDRESSES |
| MINIMIZE PEAK OF POWER CONSUMPTION IN ENTIRE SYSTEM INCLUDING BLOCKS | SET DRIVE MODE OF AGVS TO BE USED TO TRANSPORT PACKAGES HAVING DESIRED DELIVERY TIMES SO THAT AGVS ARE NOT CHARGED DURING PEAK TIME ZONE REGARDING POWER CONSUMPTION IN ENTIRE CITY, AND GENERATE DELIVERY SCHEDULE THAT ALLOWS AGVS TO DELIVER PACKAGES ON TIME IN SET DRIVE MODE |
| MINIMIZE POWER CONSUMPTION DUE TO OPERATION (MOVEMENT) OF AGVS | GENERATE DELIVERY SCHEDULE THAT MINIMIZES AMOUNT OF MOVEMENT OF AGVS, AND THAT ALLOWS AGVS TO DELIVER ALL PACKAGES HAVING NO DESIRED DELIVERY TIME WHILE DELIVERING PACKAGES HAVING DESIRED DELIVERY TIMES ON TIME |
| MINIMIZE NUMBER OF AGVS TO BE OPERATED | SELECT PACKAGES HAVING DESIRED DELIVERY TIMES AND PACKAGES HAVING NO DESIRED DELIVERY TIME, CALCULATE MAXIMUM LOADING CAPACITY OF AGVS, AND GENERATE DELIVERY SCHEDULE THAT ALLOWS AGVS TO DELIVER PACKAGES AT THEIR DESIRED DELIVERY TIMES |

FIG. 9

PHYSICAL DISTRIBUTION SYSTEM, PHYSICAL DISTRIBUTION CONTROL METHOD, AND NON-TRANSITORY COMPUTER-READABLE MEDIUM STORING PHYSICAL DISTRIBUTION CONTROL PROGRAM

CROSS-REFERENCE TO RELATED APPLICATION

This application claims priority to Japanese Patent Application No. 2021-201559 filed on Dec. 13, 2021, incorporated herein by reference in its entirety.

BACKGROUND

1. Technical Field

The disclosure relates to a physical distribution system, a physical distribution control method, and a non-transitory computer-readable medium storing a physical distribution control program. For example, the disclosure relates to a physical distribution system and a physical distribution control method that perform delivery of packages by an autonomous mobile robot with the use of an infrastructure dedicated for physical distribution that is built exclusively for an autonomous mobile robot, and relates to a non-transitory computer-readable medium storing a physical distribution control program that performs delivery of packages by an autonomous mobile robot with the use of an infrastructure dedicated for physical distribution that is built exclusively for an autonomous mobile robot.

2. Description of Related Art

In recent years, the amount of physical distribution has been increasing due to the expansion of the use of online shopping etc. Such an increase in amount of physical distribution causes problems such as traffic congestions caused by vehicles used for transportation of packages and delays in delivery due to the congestions. Japanese Unexamined Patent Application Publication No. 2003-300624 (JP 2003-300624 A) discloses an example of a technique related to a physical distribution system that eases such traffic congestion.

A physical distribution system described in JP 2003-300624 A has the following characteristics. An underground distribution base facility including an underground parking lot accessible from the ground and a package collection and dispatch center for collecting and dispatching packages is provided underneath a road near a shopping street or underneath premises such as a park. Terminal package collection and dispatch stations for collecting and dispatching packages to and from nearby stores and moving packages between aboveground and underground are provided at a plurality of locations in the premises of the shopping street. An underground transportation path network for transporting packages between the underground distribution base facility and the underground parts of the terminal package collection and dispatch stations is provided underneath the premises of the shopping street. The underground package collection and dispatch center includes a loading and unloading area where loading to and unloading from transport vehicles are performed, and an automatic warehouse for temporarily storing packages to be loaded into transport vehicles. The underground parking lot includes parking spaces for carriers and parking spaces for customers.

SUMMARY

In the physical distribution system described in JP 2003-300624 A, the package collection and dispatch locations are efficiently arranged, but the operation of moving bodies responsible for movement of packages is left to carriers, namely humans. Therefore, physical distribution cannot be operated efficiently.

The disclosure improves efficiency of transportation of a package to a consignee that is located in a city block (hereinafter sometimes simply referred to as "block").

A first aspect of the disclosure relates to a physical distribution system. The physical distribution system includes a package collection and distribution yard where a package to be transferred between outside a block and inside the block is collected and dispatched; an autonomous mobile robot that transports the package by autonomous operation; a physical distribution path through which the autonomous mobile robot passes, at least a part of the physical distribution path being located in a layer different from a layer of a sidewalk or a roadway; a facility yard located at an end of the physical distribution path; and a delivery controller configured to generate a delivery schedule for the autonomous mobile robot and to send an operation instruction to the autonomous mobile robot based on the delivery schedule. The delivery controller is configured to acquire package information including information on a delivery destination and a consignee of the package delivered to the package collection and distribution yard; generate the delivery schedule based on the package information, the delivery schedule including at least the autonomous mobile robot that transports the package, departure time of the autonomous mobile robot, and a delivery route for the autonomous mobile robot; calculate tentative delivery time of the package estimated based on the delivery schedule; send a delivery confirmation request notification to the consignee linked to the package, the delivery confirmation request notification being a notification requesting confirmation of the tentative delivery time; receive a response to the delivery confirmation request notification; control the autonomous mobile robot based on the delivery schedule generated most recently; and when confirmed time confirmed by the consignee in the response to the delivery confirmation request notification is different from the tentative delivery time, update the delivery schedule in such a manner that delivery of the package is completed at the confirmed time.

A second aspect of the disclosure relates to a physical distribution control method for a physical distribution system. The physical distribution system includes a package collection and distribution yard where a package to be transferred between outside a block and inside the block is collected and dispatched, an autonomous mobile robot that transports the package by autonomous operation, a physical distribution path through which the autonomous mobile robot passes, at least a part of the physical distribution path being located in a layer different from a layer of a sidewalk or a roadway, and a facility yard located at an end of the physical distribution path. The physical distribution control method includes acquiring package information including information on a delivery destination and a consignee of the package delivered to the package collection and distribution yard; generating a delivery schedule based on the package information, the delivery schedule including at least the autonomous mobile robot that transports the package, departure time of the autonomous mobile robot, and a delivery route for the autonomous mobile robot; calculating tentative delivery time of the package estimated based on the delivery schedule; sending a delivery confirmation request notification to the consignee linked to the package, the delivery confirmation request notification being a notification requesting confirmation of the tentative delivery time; receiving a response to the delivery confirmation request notification; and controlling the autonomous mobile robot based on the delivery schedule generated most recently. In generating the delivery schedule, when confirmed time confirmed by the consignee in the response to the delivery confirmation request notification is different from the tentative delivery time, the delivery schedule is updated in such a manner that delivery of the package is completed at the confirmed time.

A third aspect of the disclosure relates to a non-transitory computer-readable medium storing a physical distribution control program that causes a delivery controller in a physical distribution system to perform functions. The physical distribution system includes a package collection and distribution yard where a package to be transferred between outside a block and inside the block is collected and dispatched, an autonomous mobile robot that transports the package by autonomous operation, a physical distribution path through which the autonomous mobile robot passes, at least a part of the physical distribution path being located in a layer different from a layer of a sidewalk or a roadway, a facility yard located at an end of the physical distribution path, and the delivery controller configured to generate a delivery schedule for the autonomous mobile robot and to send an operation instruction to the autonomous mobile robot based on the delivery schedule. The functions include acquiring package information including information on a delivery destination and a consignee of the package delivered to the package collection and distribution yard; generating the delivery schedule based on the package information, the delivery schedule including at least the autonomous mobile robot that transports the package, departure time of the autonomous mobile robot, and a delivery route for the autonomous mobile robot; calculating tentative delivery time of the package estimated based on the delivery schedule; sending a delivery confirmation request notification to the consignee linked to the package, the delivery confirmation request notification being a notification requesting confirmation of the tentative delivery time; receiving a response to the delivery confirmation request notification; and controlling the autonomous mobile robot based on the delivery schedule generated most recently. In generating the delivery schedule, when confirmed time confirmed by the consignee in the response to the delivery confirmation request notification is different from the tentative delivery time, the delivery schedule is updated in such a manner that delivery of the package is completed at the confirmed time.

In the physical distribution system, the physical distribution control method, and the non-transitory computer-readable medium storing the physical distribution control program, the departure time of the autonomous mobile robot is set based on the confirmed time confirmed by the consignee.

According to the above aspects of the disclosure, the physical distribution system can be provided which improves efficiency of transportation of a package to a consignee located in a city block.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

A physical distribution system according to a first embodiment controls physical distribution in city blocks that use a physical distribution infrastructure 1 described below. That is, the physical distribution system according to the first embodiment controls physical distribution by a physical distribution controller that is located in the physical distribution infrastructure 1 or a physical distribution controller that can communicate with components of the physical distribution infrastructure 1 and is located at a place different from city blocks where the physical distribution infrastructure 1 is built.

Figure 1:
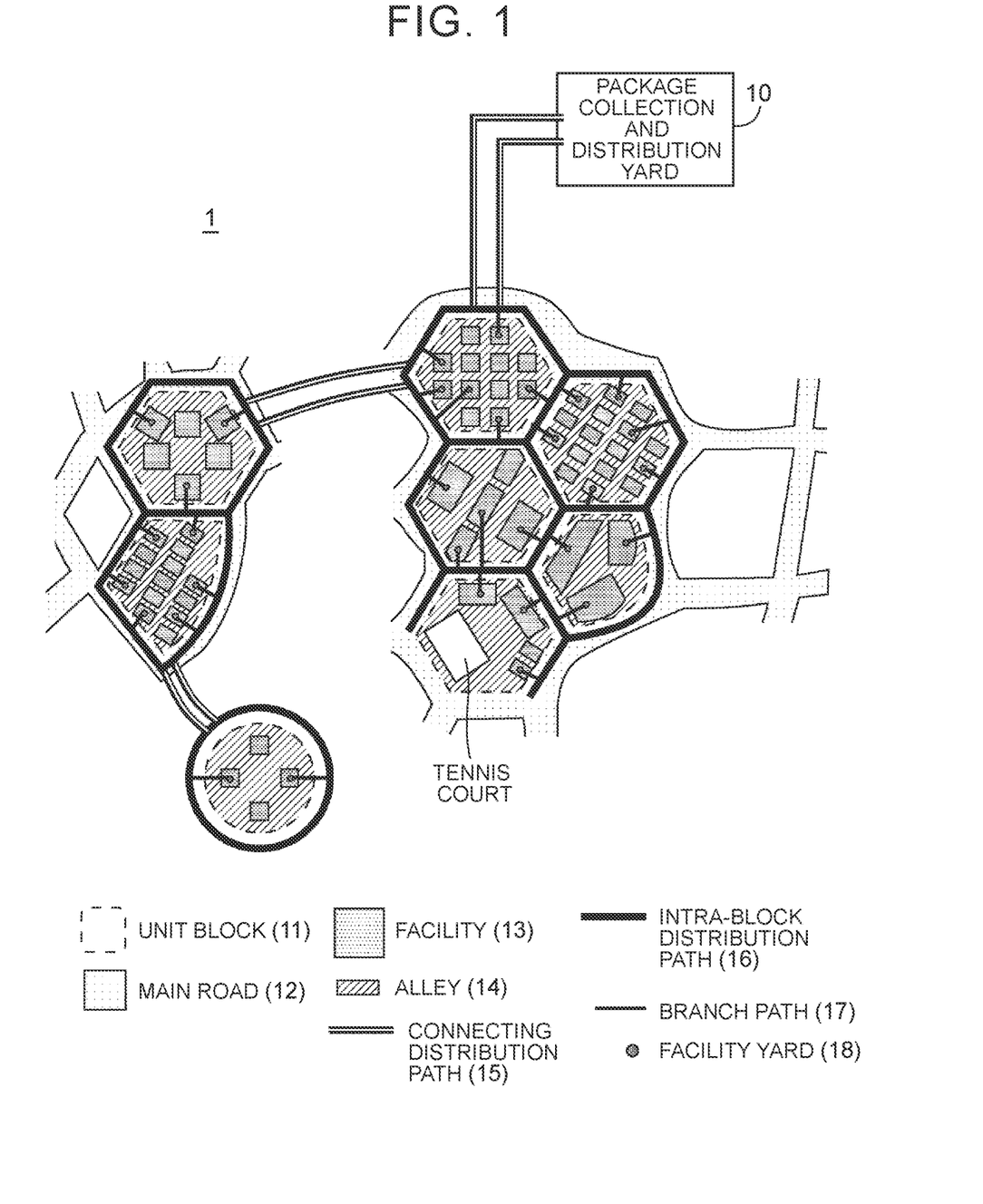
FIG. 1 schematically shows a physical distribution infrastructure according to a first embodiment.

FIG. 1 schematically shows the physical distribution infrastructure 1 according to the first embodiment. As shown in FIG. 1, the physical distribution infrastructure 1 according to the first embodiment includes a package collection and distribution yard 10, unit blocks 11, main roads 12, connecting distribution paths 15, and intra-block distribution paths 16. The unit block 11 includes facilities 13 and alleys 14. A facility yard 18 is provided in the facility 13.

In the example shown in FIG. 1, the unit blocks 11 are located in three areas located away from each other. More specifically, in FIG. 1, five unit blocks 11 are placed in a block connected to the package collection and distribution yard 10 through one connecting distribution path 15, two unit blocks 11 are placed in a block connected to the package collection and distribution yard 10 through two connecting distribution paths 15, and one unit block 11 is placed in a block connected to the package collection and distribution yard 10 through three connecting distribution paths 15. Various facilities such as houses, apartments, commercial facilities, factories, fields, parks, recreational facilities such as tennis courts, and parking lots can be provided in the unit block 11. Alleys 14 that serve as paths between the facilities 13 or paths from inside the unit block 11 to the main road 12 are also provided in the unit block 11.

When a plurality of unit blocks is arranged in this manner, a main road 12 is provided between adjacent ones of the unit blocks 11. An intra-block distribution path 16 is formed along the main road 12. Adjacent ones of the unit blocks 11 share one intra-block distribution path 16. The intra-block distribution path 16 is a path through which an autonomous mobile robot that transports packages by an autonomous operation passes, and at least a part of the intra-block distribution path 16 is located in a layer different from the layer of a sidewalk or a roadway. The autonomous mobile robot may be referred to as "automated guided vehicle (AGV)". The intra-block distribution path 16 is provided so as to have a loop shape surrounding the unit block 11. The intra-block distribution path 16 may be provided so as to be in contact with at least one side of the unit block 11. In the example shown in FIG. 1, one intra-block distribution path 16 is formed by a combination of intra-block distribution paths 16 each having a loop shape surrounding the unit block 11 and an intra-block distribution path 16 surrounding the unit block 11 except two sides of the unit block 11. The intra-block distribution path 16 has a branch path 17. The intra-block distribution path 16 is configured to allow access to the facility yard 18 in the facility 13 provided along the outer periphery of the unit block 11 through the branch path 17. The facility 13 provided along the outer periphery of the unit block 11 is a facility the branch path 17 can reach without overlapping the portion where the other facilities 13 are provided.

The intra-block distribution path 16 is a path that is exclusively used by autonomous mobile robots. However, in case of emergency etc., other specially permitted autonomous vehicles can be permitted to pass the intra-block distribution path 16. As long as the vehicles that use the intra-block distribution path 16 are vehicles capable of autonomous operation regardless of whether they are autonomous mobile robots or emergency vehicles, it is not necessary to impose, on operation of the vehicles, restrictions as safety measures that would be required in a situation where humans and these vehicles are present in the same space. Therefore, these vehicles can be efficiently operated.

As shown in FIG. 1, in the physical distribution infrastructure 1 according to the first embodiment, the package collection and distribution yard 10 is provided at a location different from the blocks formed by the unit blocks 11. The package collection and distribution yard 10 and the intra-block distribution path 16 are connected by the connecting distribution path 15. When the unit blocks 11 are not adjacent to each other and are located in areas that are physically located away from each other, the unit blocks 11 that are located in these areas are connected by the connecting distribution path 15. With this configuration, packages collected from outside the block to the package collection and distribution yard 10 can be individually delivered to each facility in the block through the connecting distribution paths 15 and the intra-block distribution paths 16. In the physical distribution infrastructure 1 according to the first embodiment, packages can also be directly delivered from the facilities in the block to the package collection and distribution yard 10. In the physical distribution infrastructure 1 according to the first embodiment, the connecting distribution paths 15 and the intra-block distribution paths 16 are configured as paths exclusively for autonomous mobile robots in a layer different from the layer for humans and vehicles in which humans ride.

As described above, the connecting distribution paths 15 and the intra-block distribution paths 16 where autonomous mobile robots pass are provided in a layer different from the layer for humans and vehicles. The autonomous mobile robots therefore will not come into contact with humans. Accordingly, for example, it is not necessary to limit the operation speed of the autonomous mobile robots for the safety of humans, so that the autonomous mobile robots can transport packages by high speed operation. One of features of the physical distribution infrastructure 1 according to the first embodiment is the structure including the intra-block distribution paths 16 and the physical distribution system using the intra-block distribution paths 16. Therefore, the structure of the intra-block distribution path 16 and the structure of the physical distribution system using the intra-block distribution paths 16 will be described in detail below.

Figure 2:
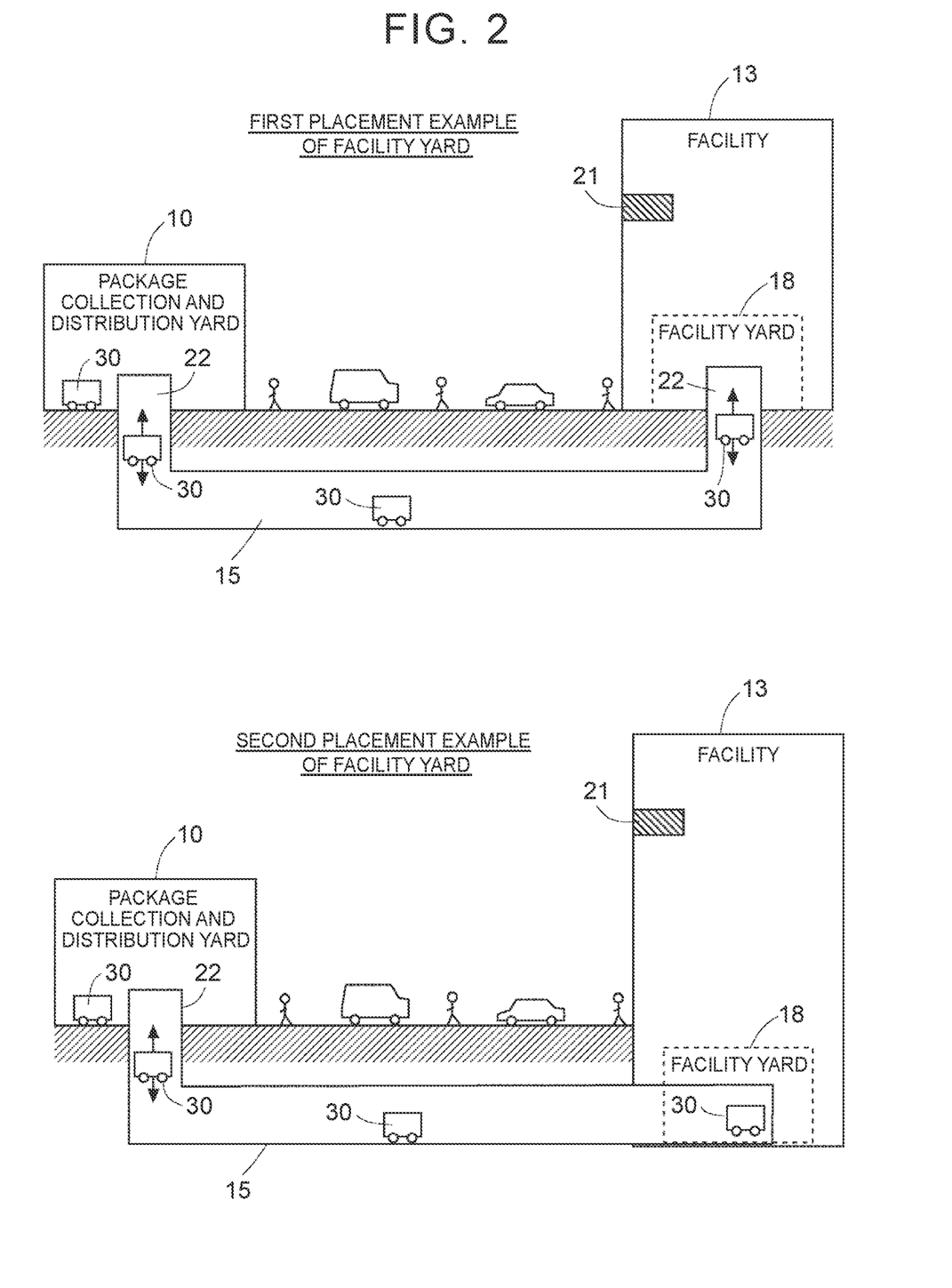
FIG. 2 schematically shows sectional structures of the physical distribution infrastructure according to the first embodiment.

FIG. 2 schematically shows sectional structures of the physical distribution infrastructure 1 according to the first embodiment; FIG. 2 mainly illustrates that the layer in which the package collection and distribution yard 10 and the facility yard 18 are located is different from the layer in which the connecting distribution paths 15 is located. FIG. 2 shows two examples of the installation layer of the facility yard 18.

As shown in FIG. 2, the connecting distribution path 15 is provided underground, i.e., provided in a layer below the surface of the ground on which humans or vehicles humans ride in move. The package collection and distribution yard 10 provided on the ground and the connecting distribution path 15 are connected by an elevator 22. Autonomous mobile robots 30 move back and forth between the package collection and distribution yard 10 and the connecting distribution path 15 via the elevator 22.

As shown in FIG. 2, the end point of the connecting distribution path 15 is located in the facility yard 18 provided in the facility 13. The facility yard 18 is provided in a layer different from the layer of the connecting distribution path 15, in the facility 13 (e.g., the first placement example shown in the upper figure of FIG. 2), or is provided in the same layer as the layer of the connecting distribution path 15 (the second placement example shown in the lower figure of FIG. 2). A delivery destination residence 21 belongs to the facility 13. The delivery destination residence 21 is the place where a person who is the destination of a package is located.

FIG. 2 shows an example in which all the connecting distribution paths 15 are formed underground. However, the connecting distribution paths 15 need not necessarily be provided underground. The connecting distribution paths 15 may be provided on or above the ground as long as the connecting distribution paths 15 are provided in a layer different from the layer where humans or vehicles move. A part of the connecting distribution paths 15 and intra-block distribution paths 16 may be provided on or above the ground. However, in some embodiments, providing all of the connecting distribution paths 15 and intra-block distribution paths 16 underground is may be used as it eliminates the need to take measures against rain for packages to be transported.

Figure 3:
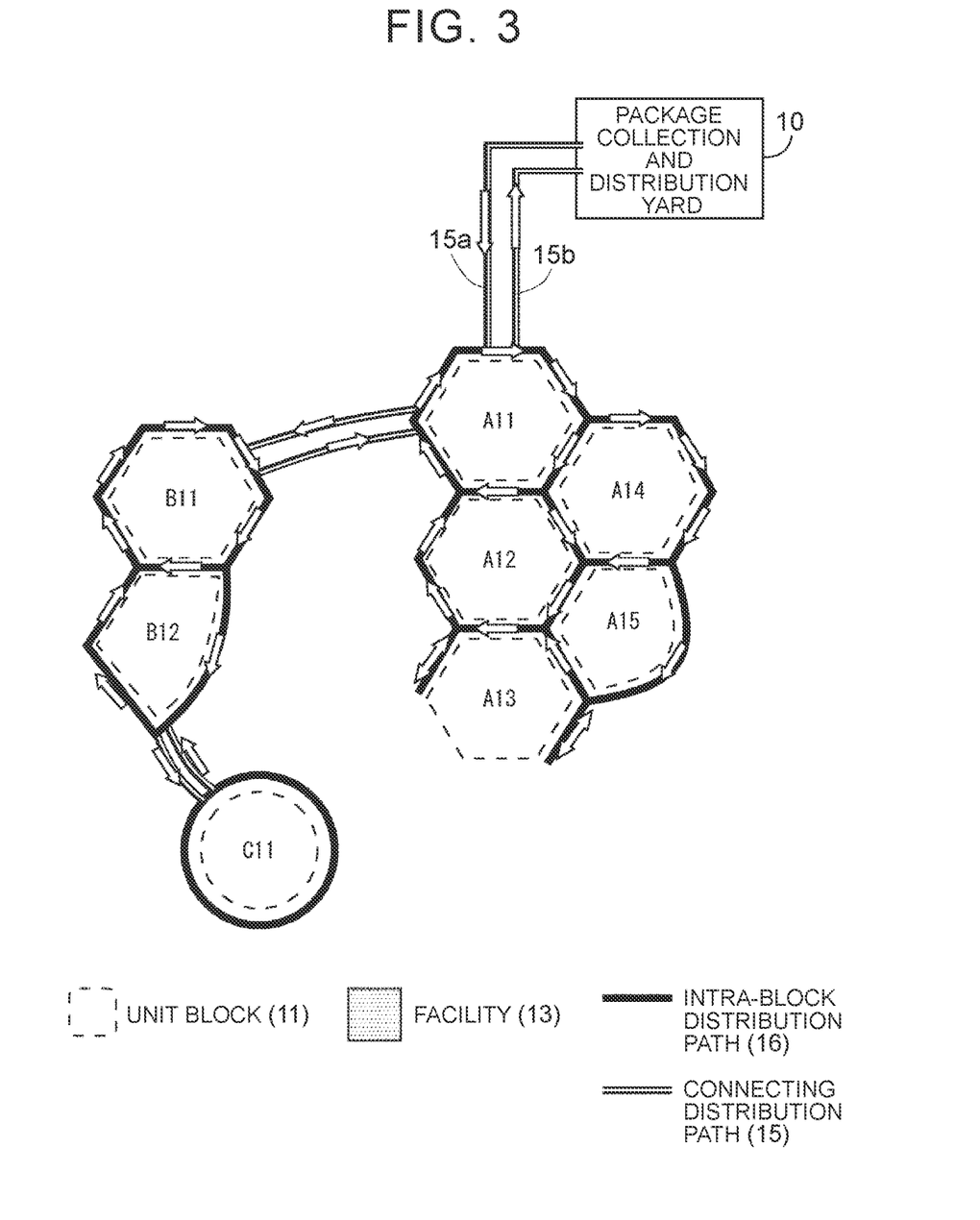
FIG. 3 illustrates restrictions on the direction of travel on intra-block distribution paths in the physical distribution infrastructure according to the first embodiment.

Next, a method for operating the autonomous mobile robots 30 on the connecting distribution paths 15 and the intra-block distribution paths 16 will be described. Although the connecting distribution paths 15 and the intra-block distribution paths 16 can also be set to two-way traffic paths, the width of each of the intra-block distribution paths 16 can be reduced by restricting the intra-block distribution paths 16 to one-way traffic. FIG. 3 illustrates restrictions on the direction of travel on the intra-block distribution paths 16 in the physical distribution infrastructure 1 according to the first embodiment.

As shown in FIG. 3, in the physical distribution infrastructure 1 according to the first embodiment, the loop-shaped paths formed by the intra-block distribution paths 16 are restricted to one-way traffic, and two-way traffic is allowed on the parts of the intra-block distribution path 16 that reach dead ends.

FIG. 3 will be described in more detail. In the example shown in FIG. 3, the connecting distribution path 15 includes a first connecting distribution path 15*a* and a second connecting distribution path 15*b*. The first connecting distribution path 15*a* is a path along which the autonomous mobile robots 30 move from the package collection and distribution yard 10 toward the intra-block distribution path 16. The second connecting distribution path 15*b* is a path along which the autonomous mobile robots 30 move from the intra-block distribution path 16 toward the package collection and distribution yard 10.

In the example shown in FIG. 3, the unit blocks connected to the package collection and distribution yard 10 through one connecting distribution path 15 are denoted by A11 to A15, the unit blocks connected to the package collection and distribution yard 10 through two connecting distribution paths 15 are denoted by B11, B12, and the unit block connected to the package collection and distribution yard 10 through three connecting distribution paths 15 is denoted by C11.

The following operation rules are set in the example shown in FIG. 3. The parts of the intra-block distribution paths 16 that surround the unit blocks are restricted to one-way traffic. Two-way traffic is allowed on the parts of the intra-block distribution path 16 that reach dead ends.

By setting such operation rules, the physical distribution infrastructure 1 according to the first embodiment can suppress reduction in operation efficiency that would be caused in a situation where, for example, the autonomous mobile robots 30 moving in opposite directions on the intra-block distribution path 16 act so as to avoid each other. In the physical distribution infrastructure 1 according to the first embodiment, the parts of the intra-block distribution paths 16 to which two-way traffic is applied have the same width as the parts of the intra-block distribution paths 16 to which the one-way traffic rule is applied. The autonomous mobile robots 30 that use the paths where two-way traffic is allowed are operated so as not to confront other autonomous mobile robots 30 by adjusting the delivery schedule.

In the physical distribution infrastructure 1 according to the first embodiment, the direction in which the autonomous mobile robots 30 turn may be restricted to right or left in the case where all the intra-block distribution paths 16 have a loop shape. Placing such restrictions can suppress reduction in operation efficiency that would be caused by, for example, causing one of two opposing autonomous mobile robots 30 moving in opposite directions to act so as to avoid the other.

Figure 4:
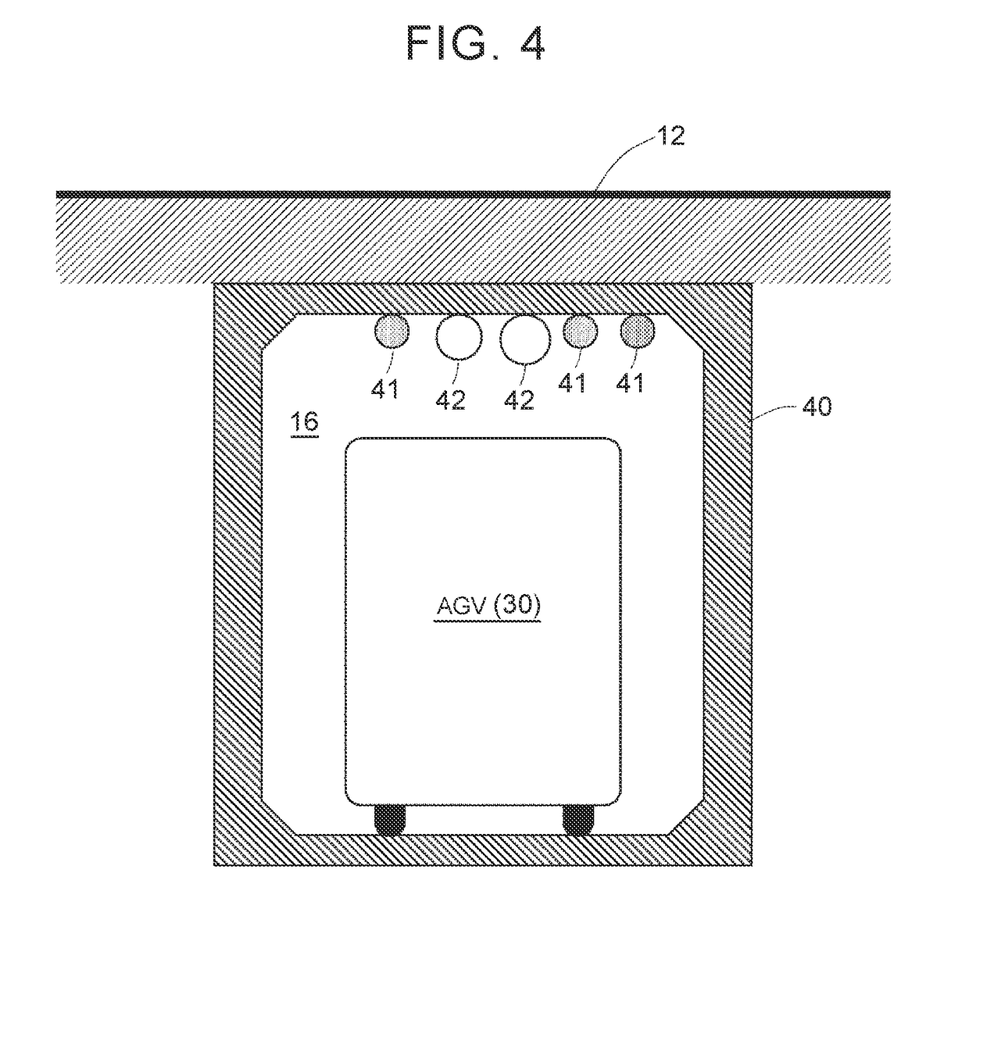
FIG. 4 is a sectional view illustrating a pipe structure of the intra-block distribution path in the physical distribution infrastructure according to the first embodiment.

Next, a pipe structure that forms the connecting distribution paths 15 and the intra-block distribution paths 16 will be described. The connecting distribution paths 15 and the intra-block distribution paths 16 need not necessarily have a pipe structure when they are placed on the ground or in a layer above the ground. However, the connecting distribution paths 15 and the intra-block distribution paths 16 need to have a pipe structure when they are placed underground. FIG. 4 is a sectional view illustrating the pipe structure of the intra-block distribution path 16 in the physical distribution infrastructure according to the first embodiment.

When the connecting distribution paths 15 and the intra-block distribution paths 16 have a pipe structure, the pipe structure is formed by combining a plurality of pipe materials (e.g., box culverts) with the same structure formed by a precast method according to a certain standard. A section of one box culvert 40 is shown in the example of FIG. 4. In the physical distribution infrastructure 1 according to the first embodiment, the intra-block distribution path 16 formed in a box culvert 40 serves as a path for the autonomous mobile robots 30. As shown in FIG. 4, in the physical distribution infrastructure 1 according to the first embodiment, infrastructure wires 41 and infrastructure pipes 42 are provided in the intra-block distribution path 16 in the box culvert 40. The intra-block distribution path 16 can thus be used not only as a path for the autonomous mobile robots 30 but also as a part of infrastructure equipment. Examples of the infrastructure wires 41 include power lines and communication lines. Examples of the infrastructure pipes 42 include water pipes and gas pipes.

As shown in FIG. 4, the box culvert 40 is buried underground below the main road 12. With this structure, it is possible to perform the work of burying the box culverts 40 simultaneously with construction of the main road 12. The construction period and cost for constructing the intra-block distribution paths 16 can thus be reduced. This structure also has maintainability because, for example, the intra-block distribution path 16 can be replaced as a part of road construction.

Figure 5:
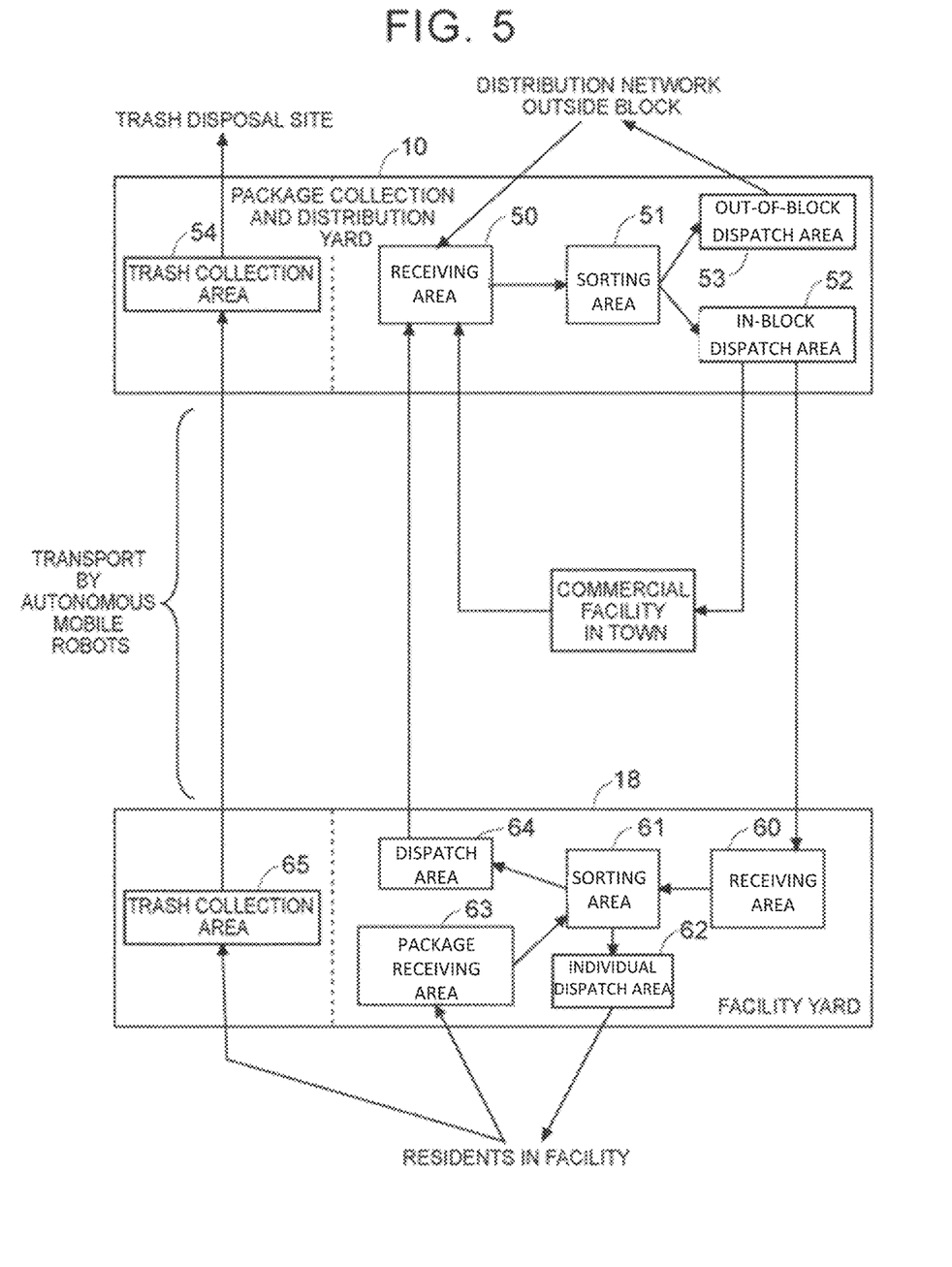
FIG. 5 illustrates movement of packages in the package collection and distribution yard and the facility yard of the physical distribution infrastructure according to the first embodiment.

Next, the flow of physical distribution in the physical distribution infrastructure 1 according to the first embodiment will be described. FIG. 5 illustrates movement of packages in the package collection and distribution yard 10 and the facility yard 18 of the physical distribution infrastructure 1 according to the first embodiment. In FIG. 5, a work area is provided for each work or process performed in the package collection and distribution yard 10 and the facility yard 18, and these work areas are shown as components of each yard.

As shown in FIG. 5, the package collection and distribution yard 10 includes a receiving area 50, a sorting area 51, an in-block dispatch area 52, an out-of-block dispatch area 53, and a trash collection area 54. The facility yard 18 includes a receiving area 60, a sorting area 61, an individual dispatch area 62, a package receiving area 63, a dispatch area 64, and a trash collection area 65.

In the physical distribution infrastructure 1 according to the first embodiment, packages are first carried from a distribution network outside the block to the receiving area 50 by a freight carrier such as a truck. In the receiving area 50, packages are received from the distribution network outside the block. The received packages are transferred to the sorting area 51. In the sorting area 51, the packages are sorted for each building to which the place where a person who is the delivery destination is located belongs, and are stored in containers. At this time, a locker having separate shelves for respective places where persons who are the delivery destinations are located may be used instead of the containers. When the locker is used, the locker may be placed in a locker room provided in the facility yard 18 of the delivery destinations. In this case, a user receives, for example, an electronic key from a host system that controls the physical distribution infrastructure 1 and unlocks the shelf designated by the electronic key to receive a package. The package can thus be delivered to the recipient.

In the in-block dispatch area 52, the containers sorted in the sorting area 51 are transferred to the autonomous mobile robots 30 that are operated in the connecting distribution paths 15 and the intra-block distribution paths 16. The host system notifies each autonomous mobile robot 30 of a facility to which the container is to be transported, and each autonomous mobile robot 30 transports the container to the designated facility. Examples of the facility to which the container is to be transported include public facilities such as the facility yard 18, and places other than places of residence, such as factories.

In the facility yard 18, the container transported by the autonomous mobile robot 30 is received at the receiving area 60. The container received in the receiving area 60 is delivered to the sorting area 61, and the packages in the container are transferred to the individual dispatch area 62. The work of delivering the packages to the individual residents of the designated delivery destinations is performed in the individual dispatch area 62.

When a resident in the facility wants to ship a package, he or she brings the package to the package receiving area 63 in the facility yard 18. The package received at the package receiving area 63 is delivered to the sorting area 61. The package received in the sorting area 61 is placed in a container and delivered to the dispatch area 64. In the dispatch area 64, the container is transferred to the autonomous mobile robot 30. The autonomous mobile robot 30 delivers the container containing the package to the receiving area 50 in the package collection and distribution yard 10 through the connecting distribution paths 15 and the intra-block distribution paths 16.

The container received in the receiving area 50 is delivered to the sorting area 51. In the sorting area 51, the containers received from a plurality of facilities 13 via the receiving area 50 are collected and delivered to the out-of-block dispatch area 53. In the out-of-block dispatch area 53, the containers received from the sorting area 51 are transferred to delivery vehicles that are operated in the distribution network outside the block.

In the physical distribution infrastructure 1 according to the first embodiment, trash from the residents in the facility is brought to the dispatch area 64, and is collected in the trash collection area 54 in the package collection and distribution yard 10 by using the autonomous mobile robots 30, the connecting distribution paths 15, and the intra-block distribution paths 16. The trash collected in the trash collection area 54 in the package collection and distribution yard 10 is carried to a trash disposal site.

In the physical distribution system according to the first embodiment, the autonomous mobile robots 30 that are operated in the physical distribution infrastructure 1 are controlled by the physical distribution controller 70 (not shown in FIG. 1 to FIG. 5). In the following description, movement of packages that is controlled by the physical distribution controller 70 is only the flow from the package collection and distribution yard 10 to the residents in the block that are consignees. However, the physical distribution controller 70 also controls movement of packages from the facility yards 18 to the package collection and distribution yard 10.

Figure 6:
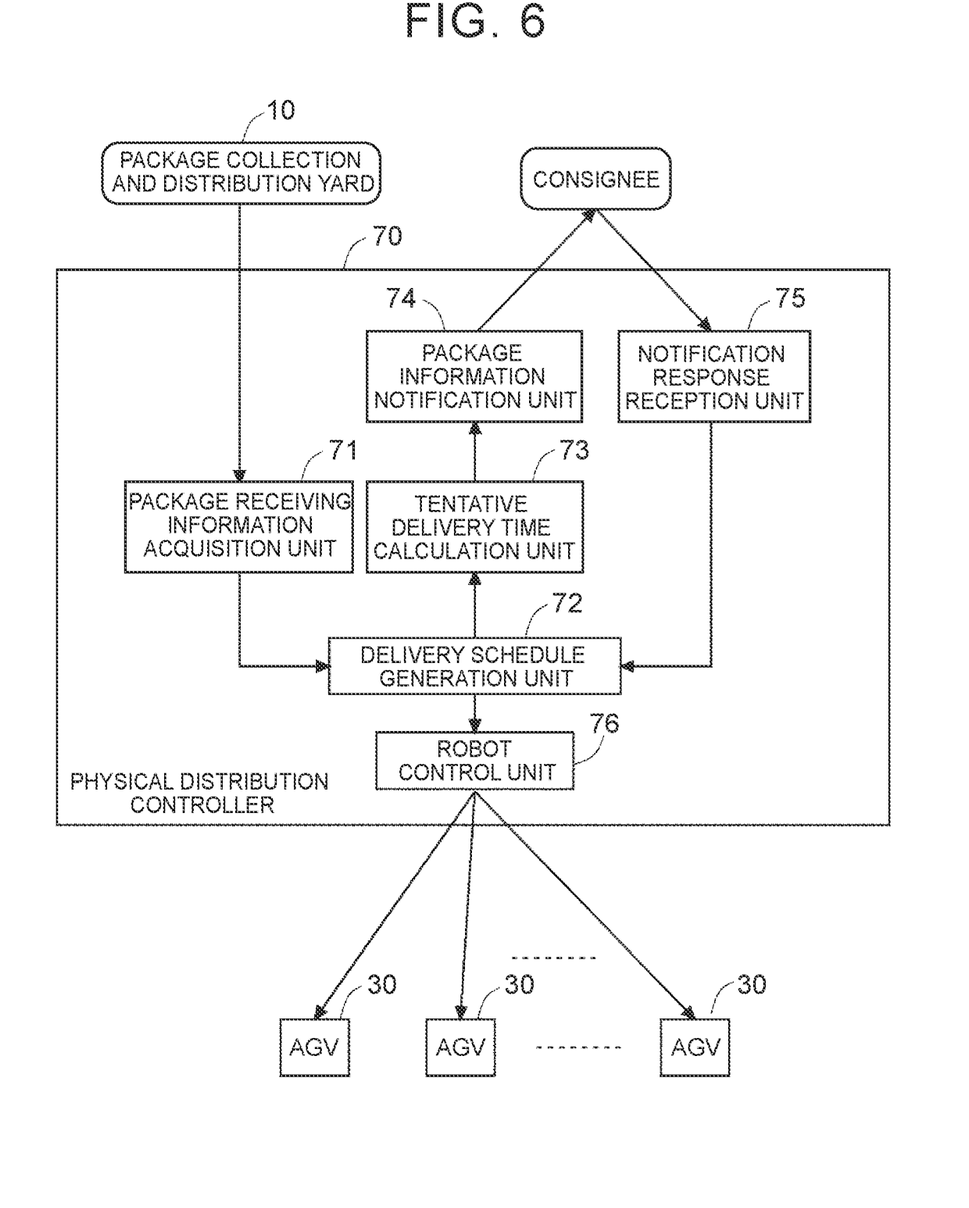
FIG. 6 is a block diagram of a physical distribution system according to the first embodiment.

FIG. 6 is a block diagram of the physical distribution system according to the first embodiment. As shown in FIG. 6, the physical distribution system according to the first embodiment acquires package information from the package collection and distribution yard 10 in the physical distribution infrastructure 1, generates a package delivery schedule based on the acquired information, and controls the autonomous mobile robots 30 according to the delivery schedule. In the physical distribution system according to the first embodiment, the physical distribution controller 70 is used to perform the above process. The physical distribution controller 70 requests a consignee to confirm the delivery time of a package. Based on the confirmation from the consignee, the physical distribution controller 70 generates a delivery schedule including the departure time of the autonomous mobile robot 30 from the package collection and distribution yard 10.

The physical distribution controller 70 includes a package receiving information acquisition unit 71, a delivery schedule generation unit 72, a tentative delivery time calculation unit 73, a package information notification unit 74, a notification response reception unit 75, and a robot control unit 76. The physical distribution controller 70 is an example of the delivery controller of the disclosure. The physical distribution controller 70 may include one or more electronic control units (ECUs) each including a processor. In other words, the physical distribution controller 70 may include one or more processors.

The package receiving information acquisition unit 71 acquires package information including information on the delivery destination and consignee of the package delivered to the package collection and distribution yard 10. The package receiving information acquisition unit 71 then sends the acquired package information to the delivery schedule generation unit 72.

Based on the package information, the delivery schedule generation unit 72 generates a delivery schedule including at least the autonomous mobile robot 30 that transports the package, the departure time of the autonomous mobile robot 30, and the delivery route for the autonomous mobile robot 30.

The tentative delivery time calculation unit 73 calculates the tentative delivery time of each package estimated based on the delivery schedule. The package information notification unit 74 sends a delivery confirmation request notification to the consignees linked to each package. The delivery confirmation request notification is a notification for requesting confirmation of the tentative delivery time. The notification response reception unit 75 receives a response to the delivery confirmation request notification.

When the time confirmed by the consignee in the response to the delivery confirmation request notification is different from the tentative delivery time, the delivery schedule generation unit 72 updates the delivery schedule so that the delivery of the package is completed at the confirmed time. In the following description, the confirmed time different from the tentative delivery time is referred to as the "desired delivery time."

The robot control unit 76 controls the autonomous mobile robots 30 based on the most up-to-date delivery schedule generated by the delivery schedule generation unit 72 (i.e., based on the delivery schedule generated most recently by the delivery schedule generation unit 72). When no response to the delivery confirmation request notification is received from the consignee before departure of the autonomous mobile robot 30 determined according to the tentative delivery time determined before the delivery confirmation request notification is sent, the delivery schedule generation unit 72 regards the tentative delivery time determined before the delivery confirmation request notification is sent, as the confirmed time confirmed by the consignee.

The delivery schedule generation unit 72 may include, for example, a processing unit that can efficiently perform scheduling, such as artificial intelligence. The delivery schedule generation unit 72 generates a delivery schedule that is most efficient in terms of at least one of items such as delivery time and power consumption. A specific example of this improvement in efficiency will be described later.

Figure 7:
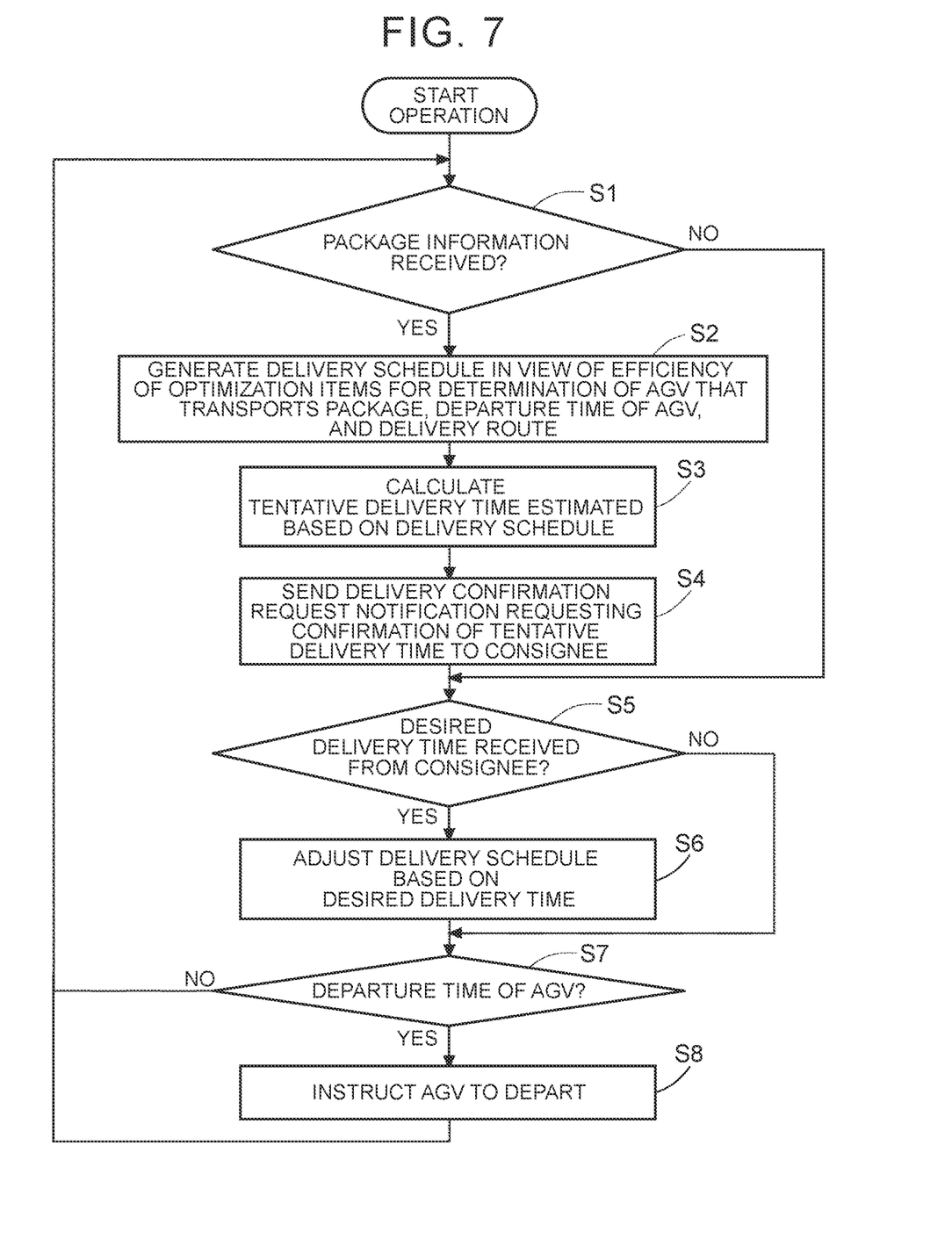
FIG. 7 is a flowchart illustrating the operation of the physical distribution system according to the first embodiment.

Next, the operation of the physical distribution system according to the first embodiment will be described. FIG. 7 is a flowchart illustrating the operation of the physical distribution system according to the first embodiment.

As shown in FIG. 7, in the physical distribution system according to the first embodiment, when receiving of a package is completed at the receiving area 50 in the package collection and distribution yard 10, the package receiving information acquisition unit 71 receives package information from the receiving area 50 (step S1). Subsequently, the delivery schedule generation unit 72 generates a delivery schedule so that predetermined optimization items become the most efficient (step S2). The predetermined optimization items are optimization items regarding the autonomous mobile robot 30 that transports the package based on the package information acquired by the package receiving information acquisition unit 71, the departure time of the autonomous mobile robot 30, and the delivery route for the autonomous mobile robot 30.

Subsequently, the tentative delivery time calculation unit 73 calculates the tentative delivery time by referring to the delivery schedule generated by the delivery schedule generation unit 72 (step S3). The package information notification unit 74 sends a delivery confirmation request notification that requests confirmation of the tentative delivery time to the consignee (step S4). Upon receiving the delivery confirmation request notification, the consignee presses a confirm button shown on the notification, or responds with desired delivery time that is different from the tentative delivery time. The notification response reception unit 75 receives either a notification confirming the tentative delivery time or the desired delivery time from the consignee. In the physical distribution system according to the first embodiment, when the consignee does not respond to the delivery confirmation request notification, the tentative delivery time for which the confirmation was requested is regarded as having been confirmed at a time when the departure time of the autonomous mobile robot 30 set according to the tentative delivery time passes. This suppresses accumulation of undelivered packages.

When the notification response reception unit 75 receives the desired delivery time from the consignee, the delivery schedule generation unit 72 adjusts the delivery schedule based on the received desired delivery time and changes the departure time of the autonomous mobile robot 30 so that the package is delivered to the consignee at the desired delivery time (steps S5 and S6). As soon as the departure time of the autonomous mobile robot 30 determined based on the most up-to-date delivery schedule comes, the robot control unit 76 instructs the autonomous mobile robot 30 to depart (steps S7 and S8). When the departure time of the autonomous mobile robot 30 has not come in step S7, the physical distribution controller 70 repeats step S1 and the following steps.

Figure 8:
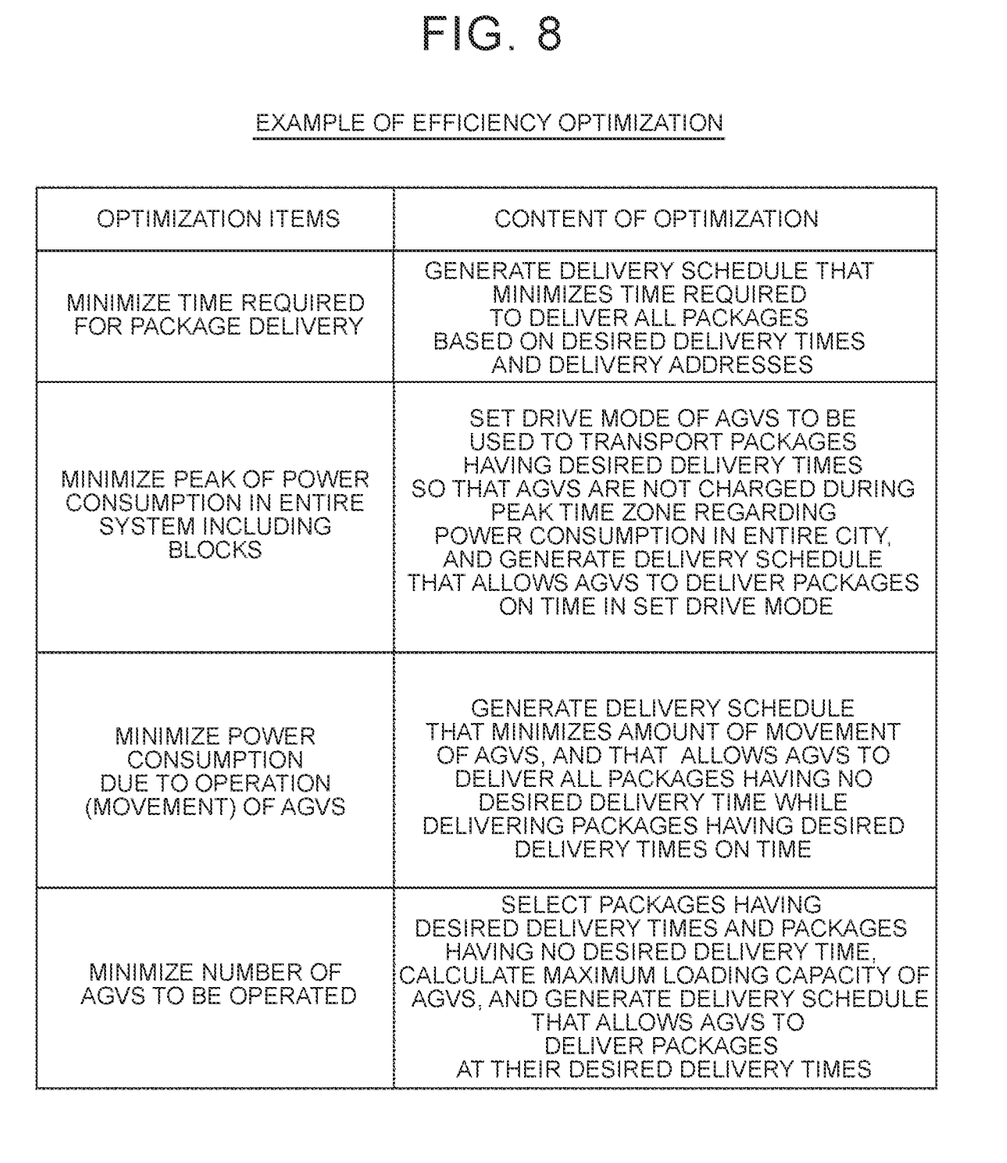
FIG. 8 is a table illustrating an example of improving physical distribution efficiency in the physical distribution system according to the first embodiment.

Next, the optimization items in the physical distribution system according to the first embodiment will be described. FIG. 8 is a table illustrating an example of improving physical distribution efficiency in the physical distribution system according to the first embodiment. The optimization items shown in FIG. 8 are an example of the items that are optimized in the physical distribution system, and optimization may be performed for other items as well.

FIG. 8 shows four optimization items. First, the delivery schedule generation unit 72 can perform optimization to minimize the time required for package delivery. In this case, the delivery schedule generation unit 72 generates a delivery schedule that minimizes the time required to deliver all packages based on the desired delivery times and the delivery addresses.

The delivery schedule generation unit 72 can optimize the delivery schedule so as to minimize the peak of the electric power consumption in the entire physical distribution system including the blocks. In this case, the delivery schedule generation unit 72 estimates the peak time zone regarding the power consumption in the entire city, and sets the drive mode of the autonomous mobile robots 30 to be used to transport packages having desired delivery times so that the autonomous mobile robots 30 are not charged during the estimated peak time zone. The delivery schedule generation unit 72 then generates a delivery schedule that allows the autonomous mobile robots 30 to deliver the packages on time in the set drive mode.

The delivery schedule generation unit 72 can generate a delivery schedule that minimizes the electric power consumption due to the operation of the autonomous mobile robots 30. In this case, the delivery schedule generation unit 72 generates a delivery schedule that minimizes the amount of movement of the autonomous mobile robots 30, and that allows the autonomous mobile robots 30 to deliver all packages having no desired delivery time while delivering packages having desired delivery times on time.

The delivery schedule generation unit 72 can generate a delivery schedule that minimizes the number of autonomous mobile robots 30 to be operated. In this case, the delivery schedule generation unit 72 selects packages having desired delivery times and packages having no desired delivery time, calculates the maximum loading capacity of the autonomous mobile robots 30, and generates a delivery schedule that allows the autonomous mobile robots 30 to deliver packages at their desired delivery times. This optimization item includes changing the height of each shelf board, the number of shelf boards, the width of each shelf board, etc. in the autonomous mobile robots 30 according to the size of each package, when the autonomous mobile robots 30 can adjust the height of each shelf board, the number of shelf boards, the width of each shelf board, etc.

Based on the above description, in the physical distribution system according to the first embodiment, the departure time of the autonomous mobile robot 30 is set based on the confirmation of the delivery time received from the consignee. This configuration improves time efficiency of package transportation of the physical distribution system according to the first embodiment.

In the physical distribution system according to the first embodiment, since the autonomous mobile robots 30 do not unnecessarily move in the physical distribution infrastructure 1. Therefore, the moving speed of the autonomous mobile robots 30 is increased, and the autonomous mobile robots 30 are less frequently caused to be in a standby state. Accordingly, the physical distribution system according to the first embodiment improves efficiency of the movement time of the autonomous mobile robots 30.

In the physical distribution infrastructure according to the first embodiment, the physical distribution infrastructure 1 has paths exclusively for the autonomous mobile robots 30. Therefore, disturbance that hinders the operation of the autonomous mobile robots 30 does not occur on the paths, and the delivery schedule can be stably managed.

Second Embodiment

Another form of the process that is performed in the delivery schedule generation unit 72 will be described in a second embodiment. In the first embodiment, the consignee's desired delivery time cannot be accepted once the scheduled departure time of the autonomous mobile robot 30 passes. In the second embodiment, however, the consignee's desired delivery time can be accepted even after the scheduled departure time of the autonomous mobile robot 30 passes. Specifically, in the second embodiment, when the consignee's desired delivery time is received after the departure of the autonomous mobile robot 30 loaded with the package corresponding to the consignee's desired delivery time, the delivery schedule generation unit 72 instructs the autonomous mobile robot 30 to bring back this package or change the order of delivery, or to bring back this package and change the order of delivery.

Figure 9:
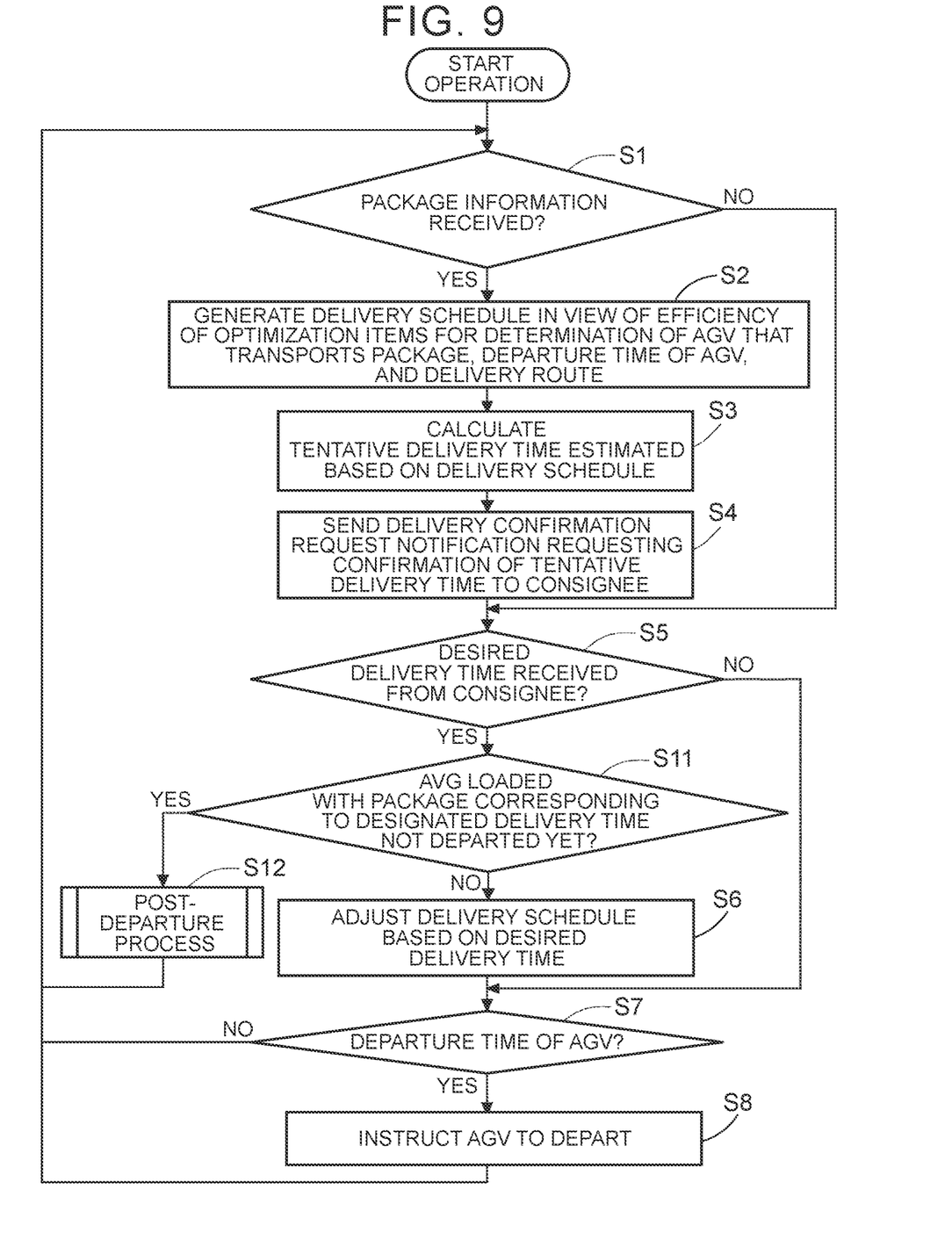
FIG. 9 is a flowchart illustrating the operation of a physical distribution system according to a second embodiment.

FIG. 9 is a flowchart illustrating the operation of a physical distribution system according to the second embodiment. As shown in FIG. 9, in the second embodiment, the delivery schedule generation unit 72 performs steps S11 and S12 in addition to the operation shown in FIG. 7.

In step S11, the delivery schedule generation unit 72 refers to the desired delivery time, and determines whether the autonomous mobile robot 30 loaded with the package corresponding to the desired delivery time has not departed. When the delivery schedule generation unit 72 determines in step S11 that the autonomous mobile robot 30 loaded with the package corresponding to the desired delivery time has not departed, the delivery schedule generation unit 72 adjusts the delivery schedule in step S6.

On the other hand, when the delivery schedule generation unit 72 determines in step S11 that the autonomous mobile robot 30 loaded with the package corresponding to the desired delivery time has already departed, the delivery schedule generation unit 72 performs a post-departure process on the autonomous mobile robot 30 that has already departed (step S12). In the post-departure process of step S12, the delivery schedule generation unit 72 instructs the autonomous mobile robot 30 to bring back the package or change the order of delivery, or to bring back the package and change the order of delivery.

In the second embodiment, the physical distribution system can hold the package for the consignee until the consignee's desired delivery time received after the departure of the autonomous mobile robot 30. The physical distribution system according to the second embodiment can thus suppress reduction in efficiency due to redelivery.

Although the disclosure made by the inventors is specifically described above based on the embodiments, the disclosure is not limited to the above embodiments, and various modifications can be made without departing from the scope of the disclosure.

What is claimed is:

1. A physical distribution system comprising:
a package collection and distribution yard where a package to be transferred between outside a block and inside the block is collected and dispatched;
an autonomous mobile robot that transports the package by autonomous operation;
a physical distribution path through which the autonomous mobile robot passes, at least a part of the physical distribution path being located in a layer different from a layer of a sidewalk or a roadway that a human and a vehicle ride on;
a facility yard located at an end of the physical distribution path; and
a delivery controller configured to generate a delivery schedule for the autonomous mobile robot and to send an operation instruction to the autonomous mobile robot based on the delivery schedule, wherein
the delivery controller is configured to:
acquire package information including information on a delivery destination and a consignee of the package delivered to the package collection and distribution yard,
generate the delivery schedule based on the package information, the delivery schedule including at least the autonomous mobile robot that transports the package, departure time of the autonomous mobile robot, and a delivery route for the autonomous mobile robot,
calculate tentative delivery time of the package estimated based on the delivery schedule, send a delivery confirmation request notification to the consignee linked to the package, the delivery confirmation request notification being a notification requesting confirmation of the tentative delivery time,
receive a response to the delivery confirmation request notification,
control the autonomous mobile robot based on the delivery schedule generated most recently,
optimize the delivery schedule to minimize a peak of electric power consumption in the entire physical distribution system by estimating a peak time zone regarding the electric power consumption in a city and setting a drive mode of the autonomous mobile robot to deliver the package on time in the set drive mode so that the autonomous mobile robot is not charged during the estimated peak time zone,
when confirmed time confirmed by the consignee in the response to the delivery confirmation request notification is different from the tentative delivery time, update the delivery schedule in such a manner that delivery of the package is completed at the confirmed time,
calculate a maximum loading capacity of the autonomous mobile robot to deliver the package by changing a height of a shelf board, a number of the shelf board, and a width of the shelf board, and
instruct, when receiving the confirmed time from the consignee after departure of the autonomous mobile robot loaded with the package that corresponds to the confirmed time and for which the delivery schedule needs to be changed, the autonomous mobile robot to bring back the package and change an order of delivery.

2. The physical distribution system according to claim 1, wherein when the delivery controller receives no response to the delivery confirmation request notification from the consignee before departure of the autonomous mobile robot determined according to the tentative delivery time determined before the delivery confirmation request notification is sent, the delivery controller regards the tentative delivery time determined before the delivery confirmation request notification is sent, as the confirmed time confirmed by the consignee.

3. The physical distribution system according to claim 1, wherein the delivery controller generates the delivery schedule that minimizes time required for delivery of the package.

4. The physical distribution system according to claim 1, wherein the delivery controller generates the delivery schedule that minimizes electric power consumption required to operate the autonomous mobile robot.

5. The physical distribution system according to claim 1, wherein:
the physical distribution system includes a plurality of the autonomous mobile robots; and the delivery controller generates the delivery schedule that minimizes the number of the autonomous mobile robots to be operated.

6. The physical distribution system according to claim 1, wherein the delivery controller generates the delivery schedule using artificial intelligence.

7. A physical distribution control method for a physical distribution system, the physical distribution control method comprising:
- acquiring package information including information on a delivery destination and a consignee of a package delivered to a package collection and distribution yard of a physical distribution system, where the package to be transferred between outside a block and inside the block is collected and dispatched;
- generating a delivery schedule based on the package information, the delivery schedule including at least an autonomous mobile robot that transports the package, departure time of the autonomous mobile robot, and a delivery route for the autonomous mobile robot, the physical distribution system includes the autonomous mobile robot that transports the package by autonomous operation, a physical distribution path through which the autonomous mobile robot passes, at least a part of the physical distribution path being located in a layer different from a layer of a sidewalk or a roadway that a human and a vehicle ride on, and a facility yard located at an end of the physical distribution path;
- calculating tentative delivery time of the package estimated based on the delivery schedule;
- sending a delivery confirmation request notification to the consignee linked to the package, the delivery confirmation request notification being a notification requesting confirmation of the tentative delivery time;
- receiving a response to the delivery confirmation request notification;
- controlling the autonomous mobile robot based on the delivery schedule generated most recently; and
- optimizing the delivery schedule to minimize a peak of electric power consumption in the entire physical distribution system by estimating a peak time zone regarding the electric power consumption in a city and setting a drive mode of the autonomous mobile robot to deliver the package on time in the set drive mode so that the autonomous mobile robot is not charged during the estimated peak time zone, wherein
- in generating the delivery schedule, when confirmed time confirmed by the consignee in the response to the delivery confirmation request notification is different from the tentative delivery time, the delivery schedule is updated in such a manner that delivery of the package is completed at the confirmed time, the method further comprising:
- calculating a maximum loading capacity of the autonomous mobile robot to deliver the package by changing a height of a shelf board, a number of the shelf board, and a width of the shelf board, and
- instructing, when receiving the confirmed time from the consignee after departure of the autonomous mobile robot loaded with the package that corresponds to the confirmed time and for which the delivery schedule needs to be changed, the autonomous mobile robot to bring back the package and change an order of delivery.

8. A non-transitory computer-readable medium storing a physical distribution control program that causes a delivery controller in a physical distribution system to perform functions, the functions comprising:
- acquiring package information including information on a delivery destination and a consignee of the package delivered to a package collection and distribution yard of the physical distribution system, where the package to be transferred between outside a block and inside the block is collected and dispatched;
- generating the delivery schedule based on the package information, the delivery schedule including at least a autonomous mobile robot that transports the package, departure time of the autonomous mobile robot, and a delivery route for the autonomous mobile robot, the physical distribution system includes the autonomous mobile robot that transports the package by autonomous operation, a physical distribution path through which the autonomous mobile robot passes, at least a part of the physical distribution path being located in a layer different from a layer of a sidewalk or a roadway that a human and a vehicle ride on, a facility yard located at an end of the physical distribution path, and the delivery controller is configured to generate a delivery schedule for the autonomous mobile robot and send an operation instruction to the autonomous mobile robot based on the delivery schedule;
- calculating tentative delivery time of the package estimated based on the delivery schedule; sending a delivery confirmation request notification to the consignee linked to the package, the delivery confirmation request notification being a notification requesting confirmation of the tentative delivery time;
- receiving a response to the delivery confirmation request notification;
- controlling the autonomous mobile robot based on the delivery schedule generated most recently; and
- optimizing the delivery schedule to minimize a peak of electric power consumption in the entire physical distribution system by estimating a peak time zone regarding the electric power consumption in a city and setting a drive mode of the autonomous mobile robot to deliver the package on time in the set drive mode so that the autonomous mobile robot is not charged during the estimated peak time zone, wherein
- in generating the delivery schedule, when confirmed time confirmed by the consignee in the response to the delivery confirmation request notification is different from the tentative delivery time, the delivery schedule is updated in such a manner that delivery of the package is completed at the confirmed time, the functions further comprising:
- calculating a maximum loading capacity of the autonomous mobile robot to deliver the package by changing a height of a shelf board, a number of the shelf board, and a width of the shelf board, and
- instructing, when receiving the confirmed time from the consignee after departure of the autonomous mobile robot loaded with the package that corresponds to the confirmed time and for which the delivery schedule needs to be changed, the autonomous mobile robot to bring back the package and change an order of delivery.

* * * * *